H. J. MITCHELL.
END THRUST BEARING.
APPLICATION FILED NOV. 29, 1911.
1,092,160.
Patented Apr. 7, 1914.
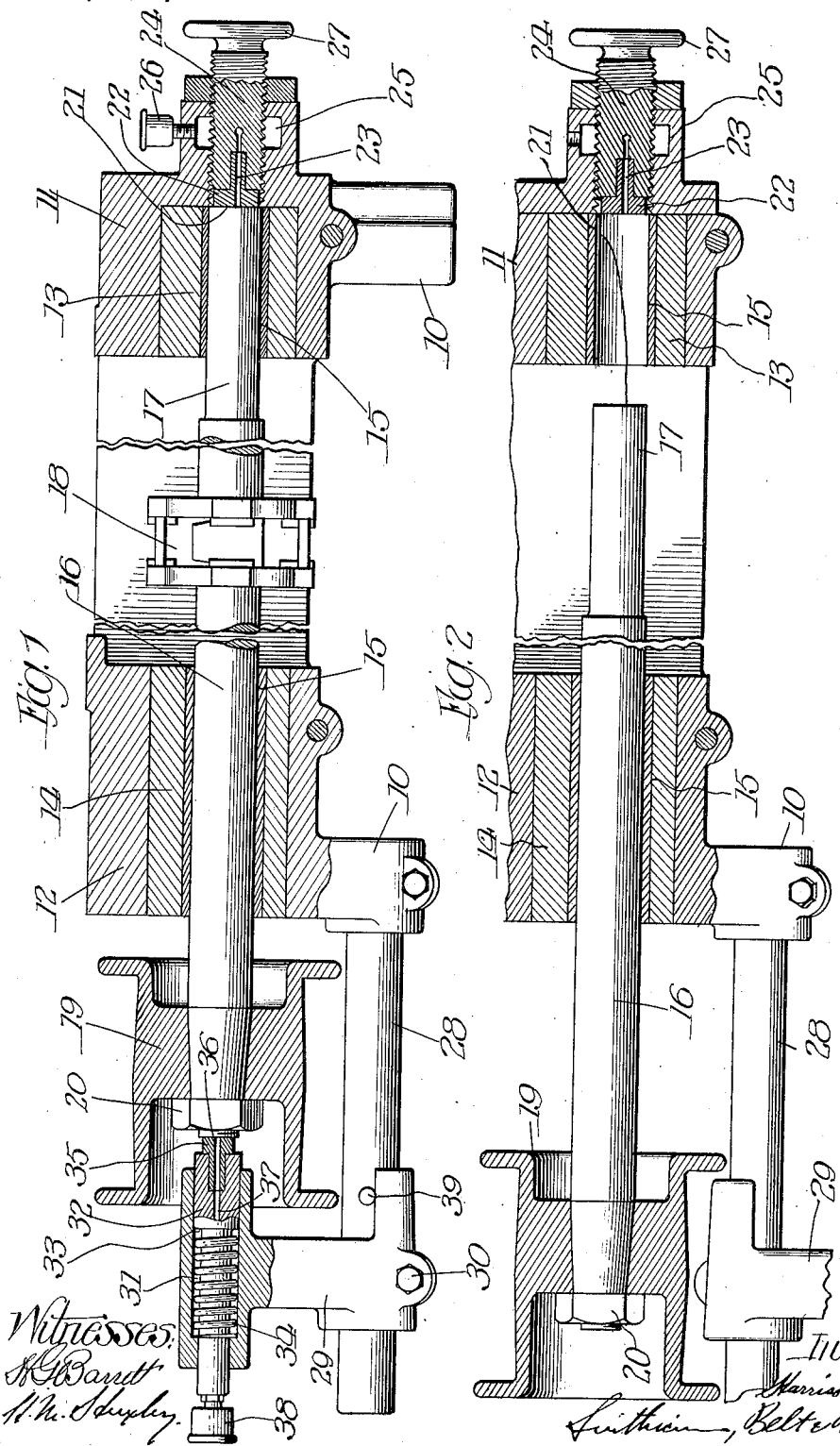

UNITED STATES PATENT OFFICE.

HARRISON J. MITCHELL, OF BELOIT, WISCONSIN, ASSIGNOR TO THE BERLIN MACHINE WORKS, OF BELOIT, WISCONSIN, A CORPORATION OF WISCONSIN.

END-THRUST BEARING.

1,092,160.  Specification of Letters Patent.  Patented Apr. 7, 1914.

Application filed November 29, 1911. Serial No. 663,012.

*To all whom it may concern:*

Be it known that I, HARRISON J. MITCHELL, a citizen of the United States, residing at Beloit, in the county of Rock and State of Wisconsin, have invented certain new and useful Improvements in End-Thrust Bearings, of which the following is a specification.

My invention relates to end thrust bearings, and refers particularly to such bearings which are adapted to be used in connection with a readily removable shaft or arbor.

I am aware that end thrust bearings have been used to a large extent in the past, but one great objection to them has been that if it is desired to remove the shaft which is engaged by such bearings it has been necessary to loosen the various connections, and it is only with difficulty that the shaft is removed.

It is the object of my improved construction to provide a mechanism by means of which the proper end thrust is always secured on both ends of a shaft while at the same time one or both of the end bearings are of such construction that they may easily and quickly be removed from the end or ends of the shaft, and the latter may be withdrawn so that a new tool or the like may be quickly placed thereon.

These and other advantages of my invention, and means for carrying out the same, will be more readily understood by reference to the accompanying drawings, which show a preferred embodiment of my improvements, and in which—

Figure 1 is a vertical longitudinal section through a shaft and its side and end bearings; Fig. 2 is a vertical longitudinal section similar to Fig. 1, except that one of the end thrust bearings has been moved into inoperative position and the shaft longitudinally moved, whereby a new tool may be placed thereon.

To the main framework 10 of the machine, which, in this embodiment of my invention, is represented as a wood-working machine, are attached the bearing boxes 11 and 12, having therein the bearings 13 and 14, each of which is provided with a sleeve or bushing 15. Extending through the bearings 13 and 14 is the shaft 16, one portion of which, 17, is preferably of slightly smaller diameter than the rest of the shaft. On the shaft 16 may be mounted any suitable tool, as, for example, the cutter head 18, adapted to be used in connection with planers. On one end of the shaft 16 is mounted the pulley 19 held in position by means of the nut 20. A belt is connected with this pulley, and thereby serves to rotate the shaft 16 and the cutter head 18. Engaging the end 21 of the shaft 16 is the end thrust bearing 22, having therethrough the oil passage 23, which, in turn, extends into the threaded bearing rod 24 and communicates with the annular chamber 25 connected with the oil cup 26. The threaded bearing rod 24 has the hand wheel 27, by means of which the rod 24 is rotated, and thereby adjusts the end bearing 22 in the proper position.

Attached to the frame 10 is the stub shaft 28, having slidably mounted thereon the bracket 29, which may be securely held in adjusted position by means of the bolt 30. The upper portion of the bracket 29 contains the recess 31, within which operates the bearing rod 32. This bearing rod has the shoulder 33 engaged by the compression spring 34, which normally tends to move the bearing rod to the right, according to the representation shown in Fig. 1. The bearing member 35 is held by the end of the bearing rod 32 and engages the end 36 of the shaft 16. Extending through the bearing member 35 and the bearing rod 32 is the oil passage 37 communicating with the oil cup 38.

Having thus described the construction of the parts used in my invention, its operation may now be readily understood: When the parts are in the position indicated in Fig. 1, the end 21 of the shaft 16 engages the bearing member 22, which is lubricated by means of oil flowing from the cup 26. The opposite end 36 of the shaft 16 is resiliently engaged by the bearing member 35, and the end 21 of the shaft 16 is thereby always held in connection with the bearing surface of the bearing member 22. If it is desired to move the shaft 16 either to the right or left, the threaded bearing rod 24 is rotated in the appropriate direction, and the bearing member 22 is correspondingly moved, thereby moving the shaft 16. At the same time the bearing member 35 on account of its resilient mounting conforms to the movement of the shaft 16. As wear occurs on the bearing members 22 and 35 the spring 34 tends to always maintain these bearing members in engagement with the ends of the shaft. When it is desired to remove the shaft 16 the bolt 30 is loosened, the bracket 29 is moved slightly to the left, and then turned downwardly on the stub shaft 28 into the position indicated in Fig. 2. The shaft 16 may then be bodily moved to the left, also as indicated in Fig. 2, and the cutter head 18, or other similar tool, may be quickly and easily withdrawn from the shaft and a new tool placed in position. The shaft 16 may then be returned to the position indicated in Fig. 1, the bracket 29 is turned into its upright position, coming in contact with the lug 39, and the bearing member 35 is brought into engagement with the end 36 of the shaft 16. The tension of the spring 34 may, of course, be regulated as desired by longitudinal adjustment of the bracket 29.

It will be apparent to those skilled in the art that many changes could be made in the detailed construction of the parts which I have described without departing from either the spirit or scope of my invention.

What I claim is:

1. In a device of the character described, the combination of a rotary shaft, an end thrust bearing for said shaft, and a support for said bearing adjustable longitudinally of said shaft and mounted for movement laterally thereof to withdraw the thrust bearing from the end of the shaft and permit the removal of the latter, substantially as described.

2. In a device of the character described, the combination of a rotary shaft, an end thrust bearing for said shaft, and a support for said bearing adjustable longitudinally of said shaft and rotatably mounted eccentrically of said shaft for movement laterally thereof to withdraw the thrust bearing from the end of the shaft and permit the removal of the latter, substantially as described.

3. In a device of the character described, the combination of a shaft, an end-thrust bearing for said shaft, and a longitudinally and laterally adjustable bracket supporting the bearing, said longitudinal adjustment permitting said shaft to be moved longitudinally and the lateral adjustment permitting said bearing to be moved out of line with said shaft, substantially as described.

4. In a device of the character described, the combination of a shaft, an end-thrust bearing for said shaft, a stub-shaft, and a bracket longitudinally slidable on said stub-shaft and supporting said bearing, said bracket being rotatable on said stub-shaft to permit said first-mentioned shaft to be moved longitudinally, substantially as described.

5. In a device of the character described, the combination of a shaft, an end-thrust bearing for said shaft, a longitudinally adjustable and rotatably mounted bracket supporting said bearing, and a resilient member adapted to hold said bearing in engagement with said shaft, substantially as described.

6. In a device of the character described, the combination of a shaft, an end-thrust bearing for said shaft, a longitudinally adjustable and rotatably mounted bracket supporting said bearing, resilient means adapted to hold said bearing in engagement with said shaft, and means for supplying a lubricating substance to the bearing face of said bearing, substantially as described.

7. In a device of the character described, the combination of a shaft, an end thrust bearing for said shaft, and a longitudinally slidable bracket supporting said bearing, said bracket being adapted to be moved laterally to permit the withdrawal of said shaft, substantially as described.

8. In a device of the character described, the combination of a shaft, a fixed bearing for said shaft, an end thrust bearing adapted to bear against the end only of said shaft, and a longitudinally and laterally adjustable bracket supporting said end thrust bearing, substantially as described.

HARRISON J. MITCHELL.

Witnesses:
 HENRY M. HUXLEY,
 L. E. HANNEN.

Copies of this patent may be obtained for five cents each, by addressing the "Commissioner of Patents, Washington, D. C."